(12) United States Patent
Simons et al.

(10) Patent No.: US 10,644,816 B2
(45) Date of Patent: May 5, 2020

(54) NARROW BAND RECEIVED SIGNAL STRENGTH INDICATOR SYSTEM

(71) Applicant: NXP B.V., Eindhoven (NL)

(72) Inventors: Sven Simons, Graz (AT); Martin Posch, Fraz (AT); Klemens Breitfuss, Voitsberg (AT)

(73) Assignee: NXP B.V., Eindhoven (NL)

(*) Notice: Subject to any disclaimer, the term of this patent is extended or adjusted under 35 U.S.C. 154(b) by 0 days.

(21) Appl. No.: 16/012,163

(22) Filed: Jun. 19, 2018

(65) Prior Publication Data

US 2019/0386758 A1 Dec. 19, 2019

(51) Int. Cl.
*H04B 17/318* (2015.01)

(52) U.S. Cl.
CPC .................. *H04B 17/318* (2015.01)

(58) Field of Classification Search
None
See application file for complete search history.

(56) References Cited

U.S. PATENT DOCUMENTS

| | | | | |
|---|---|---|---|---|
| 5,168,574 A * | 12/1992 | Gordon | ........... | H04B 7/1555 455/15 |
| 5,731,699 A * | 3/1998 | O'Byrne | ........... | H04B 17/26 324/76.19 |
| 6,282,683 B1 * | 8/2001 | Dapper | ........... | G06F 17/14 348/E7.07 |
| 6,363,127 B1 * | 3/2002 | Heinonen | ........... | H03G 3/001 375/345 |
| 6,377,552 B1 * | 4/2002 | Moran, III | ........ | H04B 10/0775 370/241 |
| 8,325,865 B1 | 12/2012 | Rofougaran et al. | | |
| 8,412,118 B2 | 4/2013 | Ojo et al. | | |
| 8,744,021 B1 * | 6/2014 | Gurney | ........... | H04B 1/1036 375/316 |
| 9,643,571 B2 | 5/2017 | Nowottnick et al. | | |
| 2003/0157915 A1 * | 8/2003 | Atkinson | ............ | B01F 5/246 455/306 |
| 2005/0176392 A1 | 8/2005 | Ruitenburg et al. | | |
| 2005/0191983 A1 | 9/2005 | Korner | | |
| 2005/0258904 A1 * | 11/2005 | Mehr | .............. | H03F 3/189 330/305 |
| 2007/0010241 A1 * | 1/2007 | Wachter | ........... | H04W 24/00 455/423 |
| 2007/0175268 A1 * | 8/2007 | Honda | ............. | G01L 23/225 73/35.04 |
| 2009/0036059 A1 | 2/2009 | Wu et al. | | |

(Continued)

FOREIGN PATENT DOCUMENTS

EP 3206043 A1 8/2017

*Primary Examiner* — Lana N Le

(57) ABSTRACT

A narrow band received signal strength indicator circuit and a method for operating the same are provided. The circuit, for example, may include, but is not limited to, at least one wideband analog amplifier configured to amplify a received input signal, an analog-to-digital converter configured to convert the received input signal from an analog signal to a digital signal, at least one digital filter configured to filter unwanted signal components from the digital signal, and a controller communicatively coupled to the at least one digital filter, the controller configured to determine a received signal strength based upon the filtered digital signal.

20 Claims, 3 Drawing Sheets

(56) References Cited

U.S. PATENT DOCUMENTS

| | | | |
|---|---|---|---|
| 2009/0075614 A1* | 3/2009 | Lin | H03G 3/3068 455/240.1 |
| 2010/0150032 A1* | 6/2010 | Zinser | H04B 1/525 370/277 |
| 2011/0069784 A1* | 3/2011 | Petilli | H04B 1/001 375/296 |
| 2011/0249596 A1* | 10/2011 | Ross | H04L 5/14 370/276 |
| 2012/0026039 A1* | 2/2012 | Ganeshan | G01S 19/33 342/357.73 |
| 2014/0142463 A1* | 5/2014 | Hui | A61B 5/123 600/559 |
| 2016/0044630 A1* | 2/2016 | Markhovsky | H04W 64/006 455/456.6 |
| 2016/0242195 A1* | 8/2016 | Kwon | H04W 72/121 |
| 2017/0230801 A1* | 8/2017 | Amsalem | G01S 5/02 |
| 2018/0162321 A1 | 6/2018 | Spiess | |

* cited by examiner

NARROW BAND RECEIVED SIGNAL STRENGTH INDICATOR SYSTEM

TECHNICAL FIELD

The present disclosure relates generally to a received signal strength indicator system, more particularly, to a received signal strength indicator system with analog amplification and digital filtering.

BACKGROUND

Passive keyless entry systems and passive keyless start systems are becoming more popular in vehicles. The respective systems offer convenience, ease of use and security. The systems operate based upon the relative locations between the vehicle and a key fob. For example, a user may be able to unlock the doors of a vehicle when the key fob is within a certain distance of the vehicle and start the engine of the vehicle when the key fob is inside the vehicle without having to touch the key fob. Accordingly, accurately determining the relative location between the vehicle and a key fob is important for the respective systems to operate in a consistent manner as expected by end users.

BRIEF DESCRIPTION OF THE DRAWINGS

At least one example of the present invention will hereinafter be described in conjunction with the following figures, wherein like numerals denote like elements, and.

For simplicity and clarity of illustration, descriptions and details of well-known features and techniques may be omitted to avoid unnecessarily obscuring the exemplary and non-limiting embodiments of the invention described in the subsequent Detailed Description. It should further be understood that features or elements appearing in the accompanying figures are not necessarily drawn to scale unless otherwise stated. For example, the dimensions of certain elements or regions in the figures may be exaggerated relative to other elements or regions to improve understanding of embodiments of the invention.

DETAILED DESCRIPTION

The following Detailed Description is merely exemplary in nature and is not intended to limit the invention or the application and uses of the invention. The term "exemplary," as appearing throughout this document, is synonymous with the term "example" and is utilized repeatedly below to emphasize that the following description provides only multiple non-limiting examples of the invention and should not be construed to restrict the scope of the invention, as set-out in the Claims, in any respect.

A narrow band received signal strength indicator system is discussed herein. The narrow band received signal strength indicator system utilizes accurate wideband analog amplification, analog-to-digital conversion and digital filtering of unwanted signal components to determine a received signal strength. The received signal strength may be used to determine the distance between two objects. For example, when the narrow band received signal strength indicator system is used in a key fob, the received signal strength may be used to determine where the key fob is relative to a vehicle. The relative location may be used as permission to unlock doors, start an engine or the like.

Figure 1:
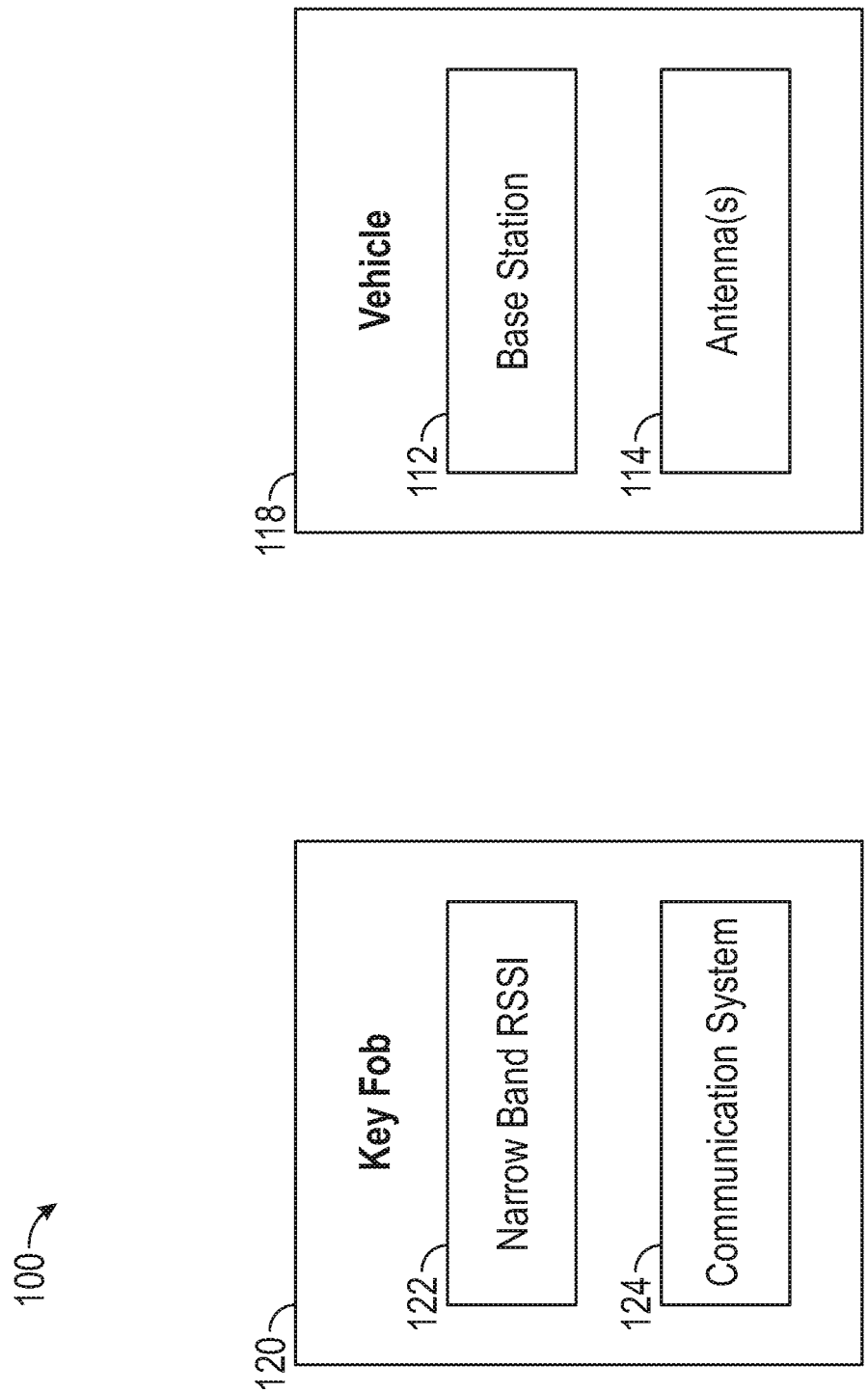
FIG. 1 is a simplified block diagram of a narrow band received signal strength indicator system in accordance with an embodiment.

FIG. 1 is a simplified block diagram of a narrow band received signal strength indicator (RSSI) system 100 in accordance with an embodiment. In the embodiment illustrated in FIG. 1, the narrow band RSSI system 100 includes a vehicle 110 and a key fob 120. As discussed in further detail below, the narrow band RSSI system 100 may be used to determine a relative location between the key fob 120 and the vehicle 110. However, the narrow band RSSI system 100 may be used to determine the relative location between any two objects.

The narrow band RSSI system 100 may be used as part of a passive keyless entry (PKE) system and a passive keyless start (PKS) system. A PKE system allows a user to open the vehicle doors and trunk without touching the key fob 120. As discussed in further detail below, the key fob 120 and the vehicle 110 interact using the narrow band RSSI system 100 and allow the vehicle doors or trunk to be unlocked, when a user touches the door or trunk or when the user is within a predetermined distance to the vehicle. The PKS system may allow a user to start the vehicle 110 using a start/stop button without having to insert a key or the key fob 120 into the vehicle 110.

The vehicle 110 includes a base station 112 and a plurality of antennas 114. The antennas 114 may be mounted inside the vehicle 110, outside the vehicle 110, or any combination thereof. As discussed in further detail below, the base station 112 outputs a carrier signal via the antennas 114. The key fob 120 includes a narrow band RSSI circuit 122, which measures the signal strength of the carrier signal. In one embodiment, for example, the key fob 120 further includes a communication system 124 to transmit the received signal strength back to the base station 112 of the vehicle. The communication system 124 may include, for example, a three-dimensional low frequency receiver and a ultra-high frequency transmitter, a ultra-high frequency transceiver, a Bluetooth transceiver, an ultra-wideband transceiver, or the like or any combination thereof. The signal strength of the carrier signal received by the narrow band RSSI circuit 122 of the key fob 120 is used to operate the PKE and/or PKS systems of the vehicle 110.

Figure 2:
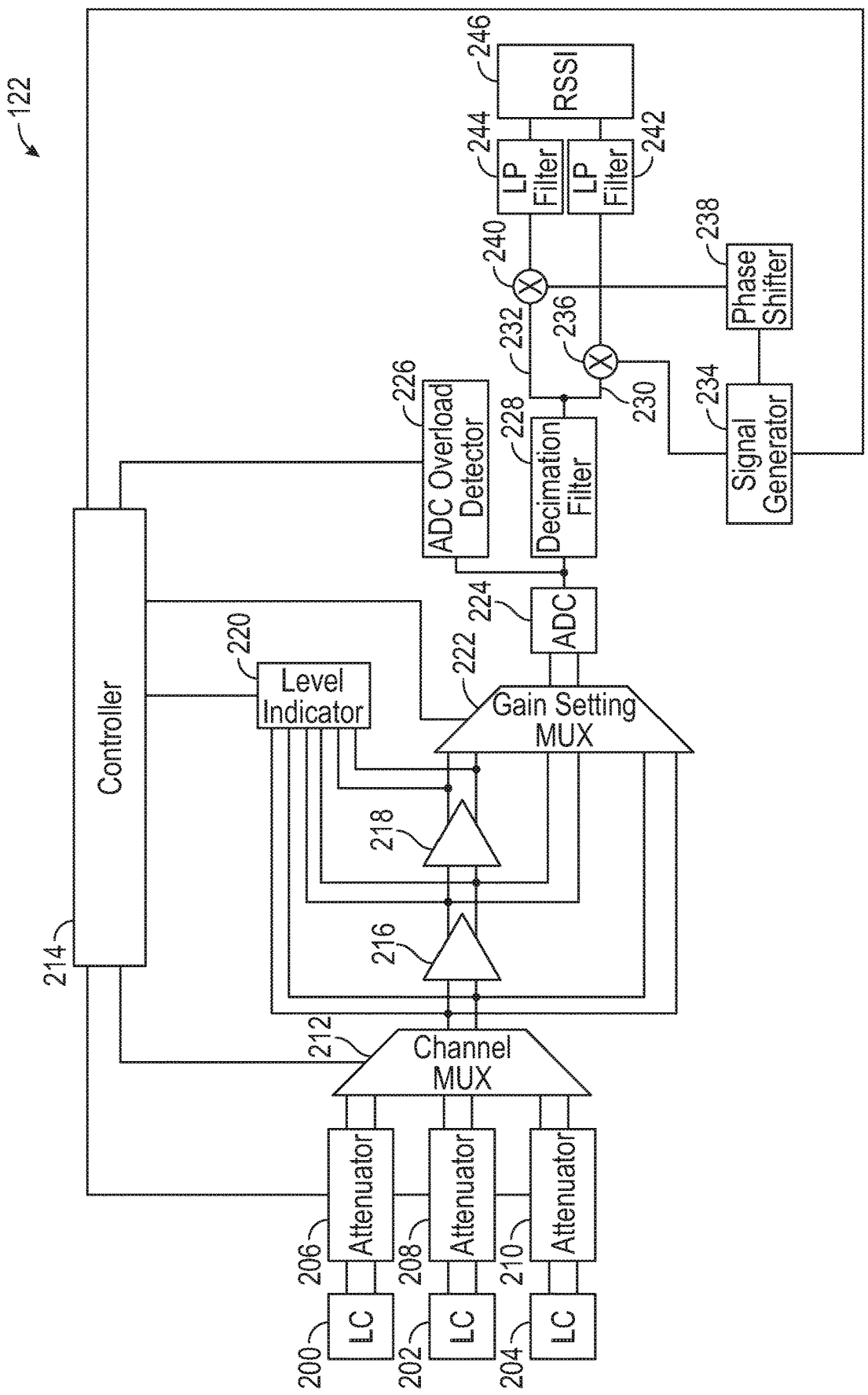
FIG. 2 is a block diagram of a narrow band received signal strength indicator circuit, in accordance with an embodiment.

FIG. 2 is a block diagram of a narrow band RSSI circuit 122, in accordance with an embodiment. The narrow band RSSI circuit 122 includes three inductor-capacitor (LC) tank circuits 200, 202 and 204. Each LC-tank circuit 200, 202 and 204 is tuned to a wanted signal frequency. In other words, a size of the inductor and capacitor can be selected such that the LC-tank circuit 200, 202 and 204 resonates at a desired frequency. In one embodiment, for example, the wanted frequency of a PKE system may be around one hundred twenty-five kilohertz (125 kHz). Each LC-tank circuit 200, 202 and 204 may be positioned to capture fields from a different axis. For example, the LC-tank circuit 200 may be positioned to capture a field in the x-axis of the Cartesian coordinate system, the LC-tank circuit 202 may be positioned to capture a field in the y-axis of the Cartesian coordinate system, and the LC-tank circuit 204 may be positioned to capture a field in the z-axis of the Cartesian coordinate system. As discussed above, the fields are generated by the base station 112 and antenna 114 in the vehicle 110. In one embodiment, for example, the fields may be generated in response to a user initiation. For example, the base station 112 and antenna 114 may generate the fields in response to a user pulling on a door handle of the vehicle 110 or pushing on a start/stop button on a dashboard of the vehicle. The base station 112 and antenna 114 in the vehicle 110 may also operate in a polling mode. In the polling mode, the base station 112 and antenna 114 periodically transmit a short low frequency wake-up pattern. When the key fob 120 gets within range and detects the wake-up pattern, the key fob 120 transmits, via the communication system 124, a response to the base station 112. The base station 112, upon receipt of the response, generates the field.

Each LC-tank circuit 200, 202 and 204 is coupled to a respective attenuator 206, 208 and 210. The attenuators 206, 208 and 210 may optionally reduce an amplitude of the voltage of the signal output by the LC-tank circuits 200, 202 and 204 by a predetermined amount. The attenuators 206, 208 and 210 can improve a range selection of the narrow band RSSI circuit 122 by attenuating very strong input signals, as discussed in further detail below.

In one embodiment, for example, the attenuators 206, 208 and 210 are coupled to a channel multiplexer 212. Each respective LC-tank circuit 200, 202 and 204 and attenuator 206, 208 and 210 pair represents an input channel for the narrow band RSSI circuit 122. Each channel may be analyzed individually by the narrow band RSSI circuit 122 to determine a received signal strength at the corresponding LC-tank circuit 200, 202 and 204. The channel multiplexer 212 is controlled by a controller 214 to selectively couple one of the respective LC-tank circuit 200, 202 and 204 and attenuator 206, 208 and 210 pairs to the rest of the narrow band RSSI circuit 122. In another embodiment, for example, the channel multiplexor 212 may be omitted. In this embodiment, the circuitry downstream from the channel multiplexor 212 in FIG. 2 would be repeated for each LC-tank circuit 200, 202 and 204.

The controller 214 may be, for example, a microcontroller, an application specific integrated circuit (ASIC), a field programmable gate array (FPGA), a central processing unit (CPU), or any other logic device or any combination thereof. As discussed in further detail below, the controller 214 determines which channel (i.e., which LC-tank circuit) to analyze in addition to controlling gain and other elements of the narrow band RSSI circuit 122.

The output of the channel multiplexer 212 is coupled to a series of fixed gain amplifiers 216 and 218. As seen in FIG. 2, the output of the channel multiplexer 212 is coupled to an input of fixed gain amplifier 216 and the output of the fixed gain amplifier 216 is coupled to the input of the fixed gain amplifier 218. As their names suggest, each fixed gain amplifier 216 and 218 amplifies the signal output by the channel multiplexer 212 by a fixed amount. In one embodiment for example, the fixed gain amplifier 216 and the fixed gain amplifier 218 may each amplify the signal by, for example eighteen decibels. However, the value by which the respective fixed gain amplifiers 216 and 218 amplify the signal can vary depending upon the needs of the narrow band RSSI system 100. One advantage of using wideband fixed gain amplifiers is that that they have accurate gain with low temperature variation and low variation over small frequency offsets. In one embodiment, for example, one or both of the fixed gain amplifiers 216 and 218 may have their gain set by the controller 214. In one embodiment, for example, the wideband fixed gain amplifiers may have a ratio between a three decibel bandwidth and center frequency greater than or equal to one.

A level indicator 220 is coupled to the output of the channel multiplexer 212, the output of the fixed gain amplifier 216 and the output of the fixed gain amplifier 218. In one embodiment, for example, the level indicator 220 may be a threshold device that triggers when the signal at the output of the channel multiplexer 212, the output of the fixed gain amplifier 216 or the output of the fixed gain amplifier 218 is above a predetermined threshold. A range indication flag is output by the level indicator 220 to the controller 214 to indicate that the signal at the respective point of the narrow band RSSI circuit 122 is above the threshold.

The controller 214, based upon the range indication flags of the received signal for the selected channel as determined by the level indicator 220, utilizes a gain-setting multiplexer 222 to select a received signal to be processed at a respective gain level. In other words, the controller selects one of the signal output by the channel multiplexer 212, the signal output by the fixed gain amplifier 216 and the signal output by the fixed gain amplifier 218 to be processed based upon the range indication flags of the signal at the respective point in the narrow band RSSI circuit 122. In one embodiment, for example, the controller 214 may select the lowest range where the level indicator 220 has not triggered. For example, if the level indicator 220 triggers at the output of the fixed gain amplifier 218, but does not trigger at the output of the fixed gain amplifier 216, the controller would select the output of the fixed gain amplifier 216 to couple to the output of the gain-setting multiplexer 222. As seen in FIG. 2, the input to the gain-setting multiplexer 222 is coupled to the output of the channel multiplexer 212, the output of the fixed gain amplifier 216 and the output of the fixed gain amplifier 218. One benefit of the utilizing the fixed gain amplifier 216, the fixed gain amplifier 218, the level indicator 220 and the gain-setting multiplexer 222 is that the arrangement reduces the dynamic range requirements of circuitry further down the path in the narrow band RSSI circuit 122. In particular, the arrangement reduces the dynamic range requirement of the analog-to-digital converter 224, discussed in further detail below. The dynamic range requirement is reduced by selecting the signal at the point in the circuit (i.e., directly output by the channel multiplexer 212, output by the fixed gain amplifier 216 or output by the fixed gain amplifier 218) where the signal is within the dynamic range of the analog-to-digital converter 224.

If the level indicator 220 triggers at the output of the channel multiplexer 212, the output of the fixed gain amplifier 216 and the output of the fixed gain amplifier 218, the controller 214 activates the respective attenuator 206, 208 or 210 for the selected channel. In one embodiment, for example, the attenuator 206, 208 or 210 may reduce the signal strength received by the respective LC-tank circuit 200, 202 and 204 by eighteen decibels. When the respective attenuator 206, 208 and 210 is activated, the level indicator 220 is used to determine the range of the output of the fixed gain amplifier 216 and the output of the fixed gain amplifier 218 and the controller 214 selects the signal within the desired range utilizing the gain-setting multiplexer 222. Accordingly, the attenuators 206, 208 and 210, in conjunction with the fixed gain amplifiers 216 and 218 and the level indicator 220, allows the narrow band RSSI circuit 122 to cover the full dynamic range of the input signal while still outputting a signal within the preferred dynamic range of the analog-to-digital converter 224.

As seen in FIG. 2, the output of the gain-setting multiplexer 222 is connected to the input of the analog-to-digital converter (ADC) 224. In one embodiment, for example, the gain-setting multiplexer 222 may be a sigma-delta ADC. A sigma-delta ADC offers a high dynamic range. However, other ADCs may be used, including, but not limited to flash converters, successive approximation converters, or the like.

In one embodiment, for example, an ADC overload detector 226 may be coupled to the output of the ADC 224. In one embodiment, for example, the ADC overload detector 226 may determine if the signal received by the ADC 224 is within an unusable gain range, either too high, by evaluating the length of either high periods and low periods in the output of the ADC 224.

A decimation filter 228 is coupled to the output of the ADC 224. The decimation filter 228 reduces the sampling rate of the digital signal output from the ADC 224, essentially operating as a low pass filter. The decimation filter 228 is used to generate a digital value with n-bits from the 1-bit output of the ADC 224. As high frequency components carry mainly noise they are cut off. When the noisy high frequency components are removed, the sample rate can be reduced to save current and operate at a lower speed.

The output of the decimation filter 228 is split down two paths for analysis. A path 230 is used to determine a quadrature component Q of the received signal and a path 232 is used to determine an in-phase component I of the received signal. A signal generator 234 outputs a fixed frequency centered around the wanted frequency. As discussed above, the wanted frequency for a PKE and/or a PKS system may be around one hundred twenty-five kilohertz. A multiplier 236 multiplies the signal output by the decimation filter 228 along the quadrature path 230 by the fixed frequency. A phase shifter 238 shifts the phase of the output if the generator 234 by ninety degrees. A multiplier 240 multiplies the signal output by the decimation filter 228 along the in-phase path 232 by the shifted wanted frequency output by the phase shifter 238. By multiplying the received signal with the wanted frequency generated by the signal generator, the wanted signal is mixed down to direct current. In other words, a frequency translation of the whole input band occurs by the wanted frequency. By multiplying the received signal with the wanted frequency generated by the signal generator, the wanted signal at one hundred twenty-five kilohertz is translated to direct current and all other input signals (e.g., signals output by sources other than the vehicle 110) are shifted by one hundred twenty-five kilohertz.

In the embodiment illustrated in FIG. 2, the output of each multiplier 236 and 240 is filtered with a digital low-pass filter 242 and 244. The filters 242 and 244 remove out-of-band components which may originate from disturbers. In the context of a PKE and/or a PKS system, the disturbers may originate from parking meters or wireless charging systems proximate to the vehicle 110. One benefit of the embodiment illustrated in FIG. 2 is that the filters 242 and 244 are implemented digitally rather than in analog. By implementing the filters 242 and 244 digitally, steep and very narrow band filters with low in-band ripple can be achieved without process variations such as are typically found in analog circuits. Furthermore, the filters 242 and 244 are implemented behind the multipliers 236 and 240 which mix in the wanted signal which allows the sample rate of the filters to be reduced (i.e., less implementation effort and current consumption). The filters 242 and 244 can be configurable in bandwidth. In one embodiment, for example, the filters 242 and 244 may be implemented to allow a switchable bandwidth of 15/8/5 kHz per low-pass. One advantage of utilizing the mixer and digital low-pass filters 242 and 244 is that they are easier to implement and can run at a lower sampling rate (less current) than a bandpass filter. The narrow band filters 242 and 244 may have a ration between a three decibel bandwidth and center frequency less than or equal to 0.25. However, in other embodiments, a bandpass filter around the wanted frequency may be used to filter out the wanted frequency component in place of the mixers and low-pass filters 242 and 244.

The output of the filters 242 produces a quadrature component Q and the output of the filter 244 produces an in-phase component I representative of a measurement of the received signal strength on the selected channel which can be used to calculate the signal strength received by the narrow band RSSI system 100. In one embodiment, for example, the output of the filters 242 and 244 may be coupled to RSSI logic 246. The RSSI logic 246 may include any combination of logic devices (e.g., an FPGA, logic gates, an ASIC, a microcontroller, or the like) which can perform calculations on the measurements. In another embodiment, for example, the output of the filters 242 and 244 may be coupled to the controller 214 which can then perform the calculations on the measurements (not shown in FIG. 2). As discussed in further detail below, multiple calculations may be made using the measurements. Any combination of the RSSI logic 246 and the controller 214 may perform the calculations. In other words, one or more of the calculations, as discussed below, may be performed by the hardware of the RSSI logic 246 and one or more may be performed by the controller 214, or either the RSSI logic 246 or the controller 214 could perform all of the calculations.

Figure 3:
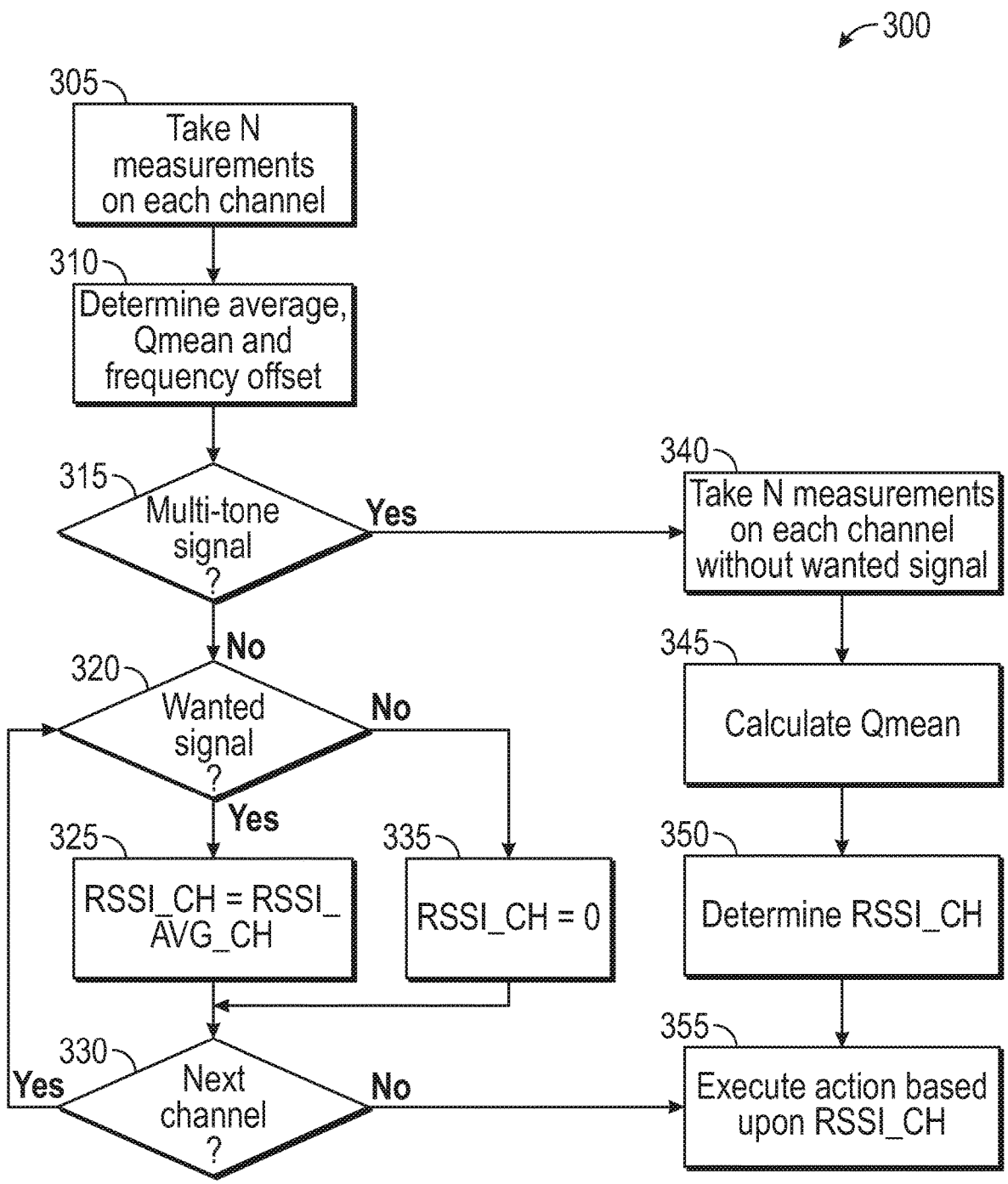
FIG. 3 illustrates a method of operating the narrow band received signal strength indicator system, in accordance with an embodiment.

FIG. 3 illustrates a method 300 of operating the narrow band RSSI system 100, in accordance with an embodiment. The method 300 begins when the controller 214 takes a predetermined number N of measurements utilizing the narrow band RSSI circuit 122 on each of the channels. (Step 305). As discussed above, the field which is being measure can be trigged by a user (i.e., when a user touches a door handle or a start/stop button) or via a polling.

The predetermined number N of measurements may be, for example sixteen or thirty-two. However, the number of measurements may vary depending upon a desired accuracy, processing speed and the like. As discussed above, the controller 214 utilizes the channel multiplexer 212, the gain-setting multiplexer 222 and either the level indicator 220 or the ADC overload detector 226, to take the measurements on each channel using the appropriate gain level (i.e., the output directly from the channel multiplexer 212 or one of the fixed gain amplifiers 216 and 218) to achieve an accurate received signal strength measurement.

The controller 214 then determines an average received signal strength, a quadratic mean and a frequency offset for each channel. (Step 310). As discussed above, the controller 214 may perform the calculations itself, receive the average received signal strength, the quadratic mean and the frequency offset for each channel from the RSSI logic 246, or any combination thereof. In one embodiment, for example, the average received signal strength (RSSI_AVG) may be calculated according to Equation 1:

$$\text{RSSI\_AVG} = \frac{1}{N} \sum_{N}^{1} \sqrt{I^2 + Q^2} \qquad \text{Equation 1}$$

where N is the predetermined number of measurements, I is the in-phase component output from filter 244 and Q is the quadrature component output from filter 242.

In one embodiment, for example, the quadratic mean (RSSI_QMEAN) may be calculated according to Equation 2:

$$RSSI\_QMEAN = \sqrt{\frac{1}{N}\sum_{N}^{1}(I^2 + Q^2)} \quad \text{Equation 2}$$

where N is the predetermined number of measurements, I is the in-phase component output from filter 244 and Q is the quadrature component output from filter 242. As discussed in further detail below, the difference between the average received signal strength and the quadratic mean can be used to determine if there is more than one signal on the channel. In other words, the difference between the average received signal strength and the quadratic mean can be used to determine if another radio frequency source is outputting a signal around the wanted signal.

In one embodiment, for example, the frequency offset (RSSI_FREQ_OFFS) may be calculated according to Equation 3:

$$RSSI\_FREQ\_OFFS = \frac{1}{(2\pi N)}\sum_{N}^{1}\frac{\Delta\varphi}{\Delta t} \quad \text{Equation 3}$$

where N is the predetermined number of measurements and $\Delta\varphi/\Delta t$ is the derivative of $\varphi$, where $\varphi=\arctan(Q/I)$, where I is the in-phase component output from filter 244 and Q is the quadrature component 242. The frequency offset may be used to distinguish between a wanted signal and an unwanted signal, as discussed in further detail below.

The controller 214 then determines if there is a multi-tone signal on the currently selected channel. (Step 315). A multi-tone signal is a signal having two or more sources present which are causing the signal. As discussed above, when there are more than one signal source causing the received signal, the average received signal strength will not equal the quadratic mean. In practice, the difference between the average received signal strength and the quadratic mean may not equal zero when there is one a single signal source present, but should be minimal. Accordingly, the controller 214 may determine that there is no multi-tone signal when the absolute value of the average received signal strength minus the quadratic mean is less than or equal to a predetermined threshold. In one embodiment, for example, the predetermined threshold may be five. However, the predetermined threshold may vary depending upon a desired filter bandwidth setting or averaging factor N.

When there is no multi-tone signal present on the selected channel, the controller 214 determines if the wanted signal is on the selected channel. (Step 320). In other words, the controller 214 determines if a signal having a frequency which corresponds to the frequency output by the base station 112 is received by the narrow band RSSI circuit 122. In one embodiment, for example, the controller 214 may determine that the wanted signal has been received by the narrow band RSSI circuit 122 when the determined frequency offset RSSI_FREQ_OFFS according to Equation 3 is less than a predetermined value. In one embodiment, for example, the predetermined value may be +/−five hundred hertz. However, the predetermined value may vary depending upon, for example, typical manufacture variation in the base station antennas.

If the determined frequency offset RSSI_FREQ_OFFS according to Equation 3 is less than the predetermined value, the controller 214 sets the received signal strength for the selected channel to the average signal strength for the channel as determined according to Equation 1. (Step 325). The controller 214 then determines if there are any channels remaining to be analyzed. (Step 330). When there is a channel remaining, the controller 214 returns to step 315 and determines if there is a wanted signal on the next channel.

When the RSSI_FREQ_OFFS according to Equation 3 is greater than the predetermined value, indicating that the signal received on the channel is from a source other than the base station 112, the controller 214 sets the received signal strength for the selected channel to 0. (Step 335). The controller 214 then determines if another channel needs to be analyzed according to Step 330.

When a multi-toned signal was detected in Step 315, the controller 214 performs a second measurement on all the channels, similar to what was done in Step 305; however, these measurements are performed without the base station 112 and antenna 114 generating the field. (Step 340). By measuring the received signals across all of the channels without the field generated by the base station 112 and antenna 114, the narrow band RSSI circuit 122 can isolate the other radio frequency sources from the base station 112.

The controller 214 then determines a quadratic mean utilizing, for example, Equation 2, based upon the measurements taken in Step 340. (Step 345). The controller can then isolate the base station 112 antenna signals from the other radio frequency sources and determines the received signal strength from the base station 112 based upon Equation 4:

$$RSSI\_CH = \sqrt{RSSI\_QMEAN1\_CH^2 - RSSI\_QMEANS\_CH^2} \quad \text{Equation 4}$$

wherein RSSI_CH is the received signal strength for the channel, RSSI_QMEAN1_CH is the quadratic mean determined in STEP 310 with the wanted frequency on and RSSI_QMEAN2_CH is the quadratic mean determined in STEP 345 with the wanted frequency off. (Step 350).

Once there are no more channels remaining, either as determined in Step 330 or after Step 350, the controller 214 executes one or more actions based upon the determines received signal strength. (Step 355). In one embodiment, for example, the controller 214 may transmit the determined received signal strength for each channel to the vehicle 110 for each antenna 114. As discussed above, the vehicle 110 may include multiple antennas 114. Each antenna 114, in turn, may emit the field to be measured by the narrow band RSSI circuit 122. The controller 214 may take into account the gain setting used by the narrow band RSSI circuit 122 when determining the received signal strength for each channel by dividing the output of the ADC 224 by the gain setting. A processor in the vehicle 110 calculates a magnetic field vector for each antenna 114 based upon the received signal strength for each channel. The magnetic field vectors can then be used to triangulate a position of the key fob 120. Based upon the position of the key fob 120, and a request from the user, the vehicle 110 may then perform an operation. For example, if a user touches a door handle, the vehicle 110 may unlock its doors if the key fob is determined to be within a predetermined distance of the vehicle. As another example, if a user touches the start/stop button in the vehicle 110, the vehicle may start the engine of the vehicle 110 if the key fob 120 is determined to be within the vehicle 110.

CONCLUSION

There has thus been provided a narrow received signal strength indicator circuit, as well as methods for operating the same. In one embodiment, for example, narrow received signal strength indicator circuit may include, but is not limited to, at least one wideband analog amplifier configured to amplify a received input signal, an analog-to-digital converter configured to convert the received input signal from an analog signal to a digital signal, at least one digital filter configured to filter unwanted signal components from the digital signal, and a controller communicatively coupled to the at least one digital filter, the controller configured to determine a received signal strength based upon the filtered digital signal.

In one embodiment, for example, a method of operating a received signal strength indicator system may include, but is not limited to, taking, via a narrow band received signal strength indicator circuit, a first predetermined number of received signal strength measurements on each of a plurality of channels, determining, by a controller, an average received signal strength, a quadratic mean and a frequency offset based upon the first predetermined number of received signal strength measurements for each of the plurality of channels, determining, by the controller, when there is a multi-tone signal on each of the plurality of channels based upon the determined average received signal strength and the calculated quadratic mean, determining, by the controller, when the wanted signal is present on the respective one of the plurality of channels when there is no multi-tone signal on a respective one of the plurality of channels, setting, by the controller, the received signal strength for the respective one of the plurality of channels to the calculated average received signal strength for the respective one of the plurality of channels when the wanted signal is present on the respective one of the plurality of channels, and setting, by the controller, the received signal strength for the respective one of the plurality of channels to zero when the wanted signal is not present on the respective one of the plurality of channels.

In one embodiment, for example, the received signal strength indicator system may include, but is not limited to, a plurality of inductor-capacitor tank circuits, each of the plurality of inductor-capacitor tank circuits associated with one of the plurality of channels, a channel multiplexer having an input and an output, each of the plurality of inductor-capacitor tank circuits electrically coupled to the input of the channel multiplexer, a first fixed gain amplifier having an input and an output, the first fixed gain amplifier electrically coupled to the output of the channel multiplexer, a second fixed gain amplifier having an input and an output, the second fixed gain amplifier electrically coupled to the output of the first fixed gain amplifier, a gain setting multiplexer having an input and an output, wherein the output of the channel multiplexer, the output of the first fixed gain amplifier and the output of the second fixed gain amplifier are electrically coupled to the input of the gain setting multiplexer, an analog-to-digital converter having an input and an output, wherein the output of the gain setting multiplexer is coupled to the input of the analog-to-digital converter, a decimation filter having an input and an output, wherein the output of the analog-to-digital converter is electrically coupled to the input of the decimation filter, a signal generator configured to generate a signal at a predetermined frequency, a first multiplier multiplying the output of the decimation filter by the signal generated by the signal generator configured, a phase shifter electrically coupled to the signal generator, the phase shifter configured to shift an output of the signal generator by ninety degrees, a second multiplier multiplying the output of the decimation filter by the phase shifted signal generated by the signal generator configured output by the phase shifter, a first low-pass filter electrically coupled to the output of the first multiplier and configured to output a quadrature component of the received signal strength measurement, and a second low-pass filter electrically coupled to the output of the second multiplier and configured to output an in-phase component of the received signal strength measurement.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A narrow band received signal strength indicator circuit, comprising:
   at least one wideband analog amplifier configured to amplify a received input signal;
   an analog-to-digital converter configured to convert the received input signal from an analog signal to a digital signal;
   a first digital filter configured to receive a quadrature component of the digital signal, filter unwanted signal components from the digital signal, and output a quadrature component of a received signal strength measurement; and
   a second digital filter configured to receive an in-phase component of the digital signal, filter unwanted signal components from the digital signal, and output an in-phase component of the received signal strength measurement; and
   a controller communicatively coupled to the first and second digital filters, the controller configured to:
      determine a received signal strength based upon the filtered digital signals,
      determine, based on a plurality of measurements of the received signal strength, when there is a multi-tone signal on each of a plurality of channels;
      determine, when there is no multi-tone signal on a respective one of the plurality of channels, when a wanted signal is present on the respective one of the plurality of channels;
      set, when the wanted signal is present on the respective one of the plurality of channels, the received signal strength for the respective one of the plurality of channels to a calculated average received signal strength for the respective one of the plurality of channels; and
      set, when the wanted signal is not present on the respective one of the plurality of channels, the received signal strength for the respective one of the plurality of channels to zero.

2. The narrow band received signal strength indicator circuit of claim 1, wherein the controller is further configured to:
   take, via the narrow band received signal strength indicator circuit, a first predetermined number of received signal strength measurements on each of the plurality of channels;

determine, for each of the plurality of channels, the calculated average received signal strength, a quadratic mean and a frequency offset based upon the first predetermined number of received signal strength measurements;

determine, based upon the determined average received signal strength and the calculated quadratic mean, when the multi-tone signal is on each of the plurality of channels.

3. The narrow band received signal strength indicator circuit of claim 2, wherein the controller is further configured to:

take, when there is a multi-tone signal on one of the plurality of channels, a second predetermined number of received signal strength measurements on the one of the plurality of channels;

calculate a quadratic mean for the one of the plurality of channels based upon the second predetermined number of received signal strength measurements;

set, for the one of the plurality of channels, the received signal strength based upon a difference between the calculated quadratic mean based upon the first predetermined number of received signal strength measurements and the calculated quadratic mean based upon the second predetermined number of received signal strength measurements.

4. The narrow band received signal strength indicator circuit of claim 2, wherein the average received signal strength, the quadratic mean and the frequency offset are based upon a number of in-phase component of a signal measured by the narrow band received signal strength indicator circuit and a number of quadrature component of the signal measured by the narrow band received signal strength indicator circuit.

5. A narrow band received signal strength indicator circuit, comprising:

at least one wideband analog amplifier configured to amplify a received input signal;

an analog-to-digital converter configured to convert the received input signal from an analog signal to a digital signal;

at least one digital filter configured to filter unwanted signal components from the digital signal;

a controller communicatively coupled to the at least one digital filter, the controller configured to determine a received signal strength based upon the filtered digital signal;

a plurality of inductor-capacitor tank circuits, each of the plurality of inductor-capacitor tank circuits associated with one of a plurality of channels;

a channel multiplexer having an input and an output, each of the plurality of inductor-capacitor tank circuits electrically coupled to the input of the channel multiplexer;

the at least one wideband analog amplifier comprising:

a first fixed gain amplifier having an input and an output, the first fixed gain amplifier electrically coupled to the output of the channel multiplexer; and a second fixed gain amplifier having an input and an output, the second fixed gain amplifier electrically coupled to the output of the first fixed gain amplifier;

a gain setting multiplexer having an input and an output, wherein the output of the channel multiplexer, the output of the first fixed gain amplifier and the output of the second fixed gain amplifier are electrically coupled to the input of the gain setting multiplexer, wherein the output of the gain setting multiplexer is coupled to the input of the analog-to-digital converter;

a decimation filter having an input and an output, wherein the output of the analog-to-digital converter is electrically coupled to the input of the decimation filter;

a signal generator configured to generate a signal at a predetermined frequency;

a first multiplier multiplying the output of the decimation filter by the signal generated by the signal generator;

a phase shifter electrically coupled to the signal generator, the phase shifter configured to shift an output of the signal generator by ninety degrees;

a second multiplier multiplying the output of the decimation filter by the phase shifted signal generated by the signal generator configured output by the phase shifter;

the first digital filter electrically coupled to the output of the first multiplier; and the second digital filter electrically coupled to the output of the second multiplier.

6. The narrow band received signal strength indicator circuit of claim 5, further comprising a level indicator communicatively coupled to the controller, the output of the channel multiplexer, the output of the first fixed gain amplifier and the output of the second fixed gain amplifier, the level indicator configured to output an indication to the controller when the output of the channel multiplexer, the output of the first fixed gain amplifier, and/or the output of the second fixed gain amplifier is above a predetermined threshold, wherein the controller is further configured to select, via the gain setting multiplexer, one of the output of the channel multiplexer, the output of the first fixed gain amplifier and the output of the second fixed gain amplifier to couple to the input of the analog-to-digital converter based upon the output of the level indicator.

7. The narrow band received signal strength indicator circuit of claim 5, wherein the controller is communicatively coupled to the output of the first digital filter and the output of the second digital filter and the controller is further configured to calculate the average received signal strength, the quadratic mean and the frequency offset.

8. The narrow band received signal strength indicator circuit of claim 5, wherein the first fixed gain amplifier and the second fixed gain amplifier have a ratio between a three decibel bandwidth and center frequency greater than or equal to one.

9. The narrow band received signal strength indicator circuit of claim 5, wherein the first digital filter and the second digital filter have a ratio between a three decibel bandwidth and center frequency less than or equal to 0.25.

10. A method of operating a received signal strength indicator system, comprising:

taking, via a narrow band received signal strength indicator circuit, a first predetermined number of received signal strength measurements on each of a plurality of channels;

determining, by a controller, an average received signal strength, a quadratic mean and a frequency offset based upon the first predetermined number of received signal strength measurements for each of the plurality of channels, determining, by the controller, when there is a multi-tone signal on each of the plurality of channels based upon the determined average received signal strength and the calculated quadratic mean;

determining, by the controller, when a wanted signal is present on the respective one of the plurality of channels when there is no multi-tone signal on a respective one of the plurality of channels;

setting, by the controller, the received signal strength for the respective one of the plurality of channels to the calculated average received signal strength for the respective one of the plurality of channels when the wanted signal is present on the respective one of the plurality of channels; and setting, by the controller, the received signal strength for the respective one of the plurality of channels to zero when the wanted signal is not present on the respective one of the plurality of channels.

11. The method of claim 10, further comprising:
taking, via the narrow band received signal strength indicator circuit, a second predetermined number of received signal strength measurements on the one of the plurality of channels when there is a multi-tone signal on one of the plurality of channels;
determining, by the controller, a quadratic mean for the one of the plurality of channels based upon the second predetermined number of received signal strength measurements;
setting, by the controller for the one of the plurality of channels, the received signal strength based upon a difference between the calculated quadratic mean based upon the first predetermined number of received signal strength measurements and the calculated quadratic mean based upon the second predetermined number of received signal strength measurements.

12. The method of claim 10, wherein the narrow band received signal strength indicator circuit comprises:
a plurality of inductor-capacitor tank circuits, each of the plurality of inductor-capacitor tank circuits associated with one of the plurality of channels;
a channel multiplexer having an input and an output, each of the plurality of inductor-capacitor tank circuits electrically coupled to the input of the channel multiplexer;
a first fixed gain amplifier having an input and an output, the first fixed gain amplifier electrically coupled to the output of the channel multiplexer;
a second fixed gain amplifier having an input and an output, the second fixed gain amplifier electrically coupled to the output of the first fixed gain amplifier;
a gain setting multiplexer having an input and an output, wherein the output of the channel multiplexer, the output of the first fixed gain amplifier and the output of the second fixed gain amplifier are electrically coupled to the input of the gain setting multiplexer;
an analog-to-digital converter having an input and an output, wherein the output of the gain setting multiplexer is coupled to the input of the analog-to-digital converter;
a decimation filter having an input and an output, wherein the output of the analog-to-digital converter is electrically coupled to the input of the decimation filter;
a signal generator configured to generate a signal at a predetermined frequency;
a first multiplier multiplying the output of the decimation filter by the signal generated by the signal generator;
a phase shifter electrically coupled to the signal generator, the phase shifter configured to shift an output of the signal generator by ninety degrees;
a second multiplier multiplying the output of the decimation filter by the phase shifted signal generated by the signal generator configured output by the phase shifter;
a first low-pass filter electrically coupled to the output of the first multiplier and configured to output a quadrature component of the received signal strength measurement; and
a second low-pass filter electrically coupled to the output of the second multiplier and configured to output an in-phase component of the received signal strength measurement.

13. The method of claim 12, further comprising:
measuring, by a level indicator communicatively coupled to the controller, a decibel level at the output of the channel multiplexer, at the output of the first fixed gain amplifier and at the output of the second fixed gain amplifier; and
selecting, by the controller via the gain setting multiplexer, one of the output of the channel multiplexer, the output of the first fixed gain amplifier and the output of the second fixed gain amplifier to couple to the input of the analog-to-digital converter based upon the decibel level at the output of the channel multiplexer, the decibel level at the output of the first fixed gain amplifier and the decibel level at the output of the second fixed gain amplifier.

14. The method of claim 12, further comprising:
measuring, by an analog-to-digital converter overload detector communicatively coupled to the output of the analog-to-digital converter and the controller, a decibel level at the output of the analog-to-digital converter; and
selecting, by the controller via the gain setting multiplexer, one of the output of the channel multiplexer, the output of the first fixed gain amplifier and the output of the second fixed gain amplifier to couple to the input of the analog-to-digital converter based upon the decibel level at the output of the analog-to-digital converter.

15. The method of claim 12, wherein the controller is communicatively coupled to the output of the first low-pass filter and the output of the second low-pass filter and the controller is further configured to calculate the average received signal strength, the quadratic mean and the frequency offset.

16. The method according to claim 12, wherein the first fixed gain amplifier and the second fixed gain amplifier have a ratio between a three decibel bandwidth and center frequency greater than or equal to one.

17. The method according to claim 12, wherein the first low-pass filter and the second low pass filter have a ratio between a three decibel bandwidth and center frequency less than or equal to 0.25.

18. The method according to claim 10, wherein the average received signal strength, the quadratic mean and the frequency offset are based upon a number of in-phase component of a signal measured by the narrow band received signal strength indicator circuit and a number of quadrature component of the signal measured by the narrow band received signal strength indicator circuit.

19. A received signal strength indicator system, comprising:
a plurality of inductor-capacitor tank circuits, each of the plurality of inductor-capacitor tank circuits associated with one of the plurality of channels;
a channel multiplexer having an input and an output, each of the plurality of inductor-capacitor tank circuits electrically coupled to the input of the channel multiplexer;
a first fixed gain amplifier having an input and an output, the first fixed gain amplifier electrically coupled to the output of the channel multiplexer;
a second fixed gain amplifier having an input and an output, the second fixed gain amplifier electrically coupled to the output of the first fixed gain amplifier;

a gain setting multiplexer having an input and an output, wherein the output of the channel multiplexer, the output of the first fixed gain amplifier and the output of the second fixed gain amplifier are electrically coupled to the input of the gain setting multiplexer;

an analog-to-digital converter having an input and an output, wherein the output of the gain setting multiplexer is coupled to the input of the analog-to-digital converter;

a decimation filter having an input and an output, wherein the output of the analog-to-digital converter is electrically coupled to the input of the decimation filter;

a signal generator configured to generate a signal at a predetermined frequency;

a first multiplier multiplying the output of the decimation filter by the signal generated by the signal generator;

a phase shifter electrically coupled to the signal generator, the phase shifter configured to shift an output of the signal generator by ninety degrees;

a second multiplier multiplying the output of the decimation filter by the phase shifted signal generated by the signal generator configured output by the phase shifter;

a first low-pass filter electrically coupled to the output of the first multiplier and configured to output a quadrature component of the received signal strength measurement; and a second low-pass filter electrically coupled to the output of the second multiplier and configured to output an in-phase component of the received signal strength measurement.

20. The received signal strength indicator system of claim 19, further comprising a controller configured to:

take a first predetermined number of received signal strength measurements on each of a plurality of channels based upon the output of the first low-pass filter and the second low-pass filter;

determine, for each of the plurality of channels, an average received signal strength, a quadratic mean and a frequency offset based upon the first predetermined number of received signal strength measurements;

determine, based upon the determined average received signal strength and the calculated quadratic mean, when there is a multi-tone signal on each of the plurality of channels;

determine, when there is no multi-tone signal on a respective one of the plurality of channels, when the wanted signal is present on the respective one of the plurality of channels;

set, when the wanted signal is present on the respective one of the plurality of channels, the received signal strength for the respective one of the plurality of channels to the calculated average received signal strength for the respective one of the plurality of channels;

set, when the wanted signal is not present on the respective one of the plurality of channels, the received signal strength for the respective one of the plurality of channels to zero;

take, when there is a multi-tone signal on one of the plurality of channels, a second predetermined number of received signal strength measurements on the one of the plurality of channels, wherein the second predetermined number of received signal strength measurements are taken with the signal generator bypassed by the controller;

calculate a quadratic mean for the one of the plurality of channels based upon the second predetermined number of received signal strength measurements; and set, for the one of the plurality of channels, the received signal strength based upon a difference between the calculated quadratic mean based upon the first predetermined number of received signal strength measurements and the calculated quadratic mean based upon the second predetermined number of received signal strength measurements.

* * * * *